(12) United States Patent  
Mo et al.

(10) Patent No.: US 8,489,051 B2
(45) Date of Patent: Jul. 16, 2013

(54) LOW-POWER AND NOISE-CANCELLING WIDEBAND RECEIVER FRONT-END

(75) Inventors: Shih Hsiung Mo, San Jose, CA (US); Yan Cui, Plano, TX (US); Chung-Hsing Chang, Milpitas, CA (US); An Hue Ta, Elk Grove, CA (US)

(73) Assignee: Aviacomm Inc., Santa Clara, CA (US)

( * ) Notice: Subject to any disclaimer, the term of this patent is extended or adjusted under 35 U.S.C. 154(b) by 0 days.

(21) Appl. No.: 13/300,430

(22) Filed: Nov. 18, 2011

(65) Prior Publication Data

US 2013/0052973 A1    Feb. 28, 2013

Related U.S. Application Data

(60) Provisional application No. 61/527,004, filed on Aug. 24, 2011.

(51) Int. Cl.
*H04B 1/18* (2006.01)

(52) U.S. Cl.
USPC .......................... 455/188.1; 455/313; 455/334

(58) Field of Classification Search
USPC ................ 455/188.1, 190.1, 191.3, 313, 323, 455/333, 334, 339–341
See application file for complete search history.

(56) References Cited

U.S. PATENT DOCUMENTS

| | | | | |
|---|---|---|---|---|
| 5,790,587 A | * | 8/1998 | Smith et al. | 375/147 |
| 6,115,590 A | * | 9/2000 | Tanaka | 455/266 |
| 7,116,952 B2 | * | 10/2006 | Arafa | 455/132 |

* cited by examiner

*Primary Examiner* — Nhan Le
(74) *Attorney, Agent, or Firm* — Shun Yao; Park, Vaughan, Fleming & Dowler LLP

(57) ABSTRACT

One embodiment of the present invention provides a receiver for wireless communication. The receiver includes a group of band-pass filters (BPFs), a wideband amplifier coupled to the BPFs, and a tunable demodulator coupled to the wideband amplifier. A particular BPF is configured to filter RF signals at a particular frequency band. The wideband amplifier is configured to amplify the filtered RF signals. The tunable demodulator is configured to demodulate the amplified RF signals.

14 Claims, 5 Drawing Sheets

LOW-POWER AND NOISE-CANCELLING WIDEBAND RECEIVER FRONT-END

RELATED APPLICATION

This application claims the benefit of U.S. Provisional Application No. 61/527,004, entitled "Low-Power and Noise-Cancelling Wideband Receiver Front-End," by inventors Shih Hsiung Mo, Yan Cui, Chung-Hsing Chang, and An Hue Ta, filed 24 Aug. 2011.

BACKGROUND

1. Field

The present disclosure relates generally to the receiver front-end of a wireless communication system. More specifically, the present disclosure relates to a low-power wideband receiver front-end that has noise-cancelling capability.

2. Related Art

Traditional wireless communication systems are usually designed for a specific standard, such as GSM (Global System for Mobile Communications) or Wideband Code Division Multiple Access (W-CDMA), each requiring different carrier frequencies. For example, the carrier frequency of the GSM (Global System for Mobile) signals varies from 800 MHz to 1 GHz, while the carrier frequency of the W-CDMA signals varies between 2-3 GHz. Current demand for the convergence of wireless services, in which users can access different standards from the same wireless device, is driving the development of multi-standard and multi-band transceivers, which are capable of transmitting/receiving radio signals in the entire wireless communication spectrum (from 300 MHz to 3.6 GHz).

SUMMARY

One embodiment of the present invention provides a receiver for wireless communication. The receiver includes a group of band-pass filters (BPFs), a wideband amplifier coupled to the BPFs, and a tunable demodulator coupled to the wideband amplifier. A particular BPF is configured to filter RF signals at a particular frequency band. The wideband amplifier is configured to amplify the filtered RF signals. The tunable demodulator is configured to demodulate the amplified RF signals.

In a variation on this embodiment, the receiver includes a single-pole multi-throw switch situated between the BPFs and the wideband amplifier. The switch is configured to switch an output of a BPF to an input of the wideband amplifier.

In a variation on this embodiment, the wideband amplifier and the tunable demodulator are located on a same integrated circuit (IC) chip.

In a variation on this embodiment, the tunable demodulator is a quadrature demodulator.

In a variation on this embodiment, carrier frequencies of the RF signals vary between 300 MHz and 3.6 GHz.

In a variation on this embodiment, an input resistance of the wideband amplifier is 50 Ohm.

In a variation on this embodiment, the wideband amplifier has two poles.

In a variation on this embodiment, the wideband amplifier includes a noise-cancelling stage.

In a further variation, the noise-cancelling stage includes a common-emitter amplifier.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a solution for a low-power, noise-cancelling receiver front-end that does not require any tuning In one embodiment, the receiver chip includes a wideband low-noise amplifier (LNA) that is capable of amplifying RF (radio frequency) signals over a wide frequency range.

Wideband Receiver Front-End

Figure 1:
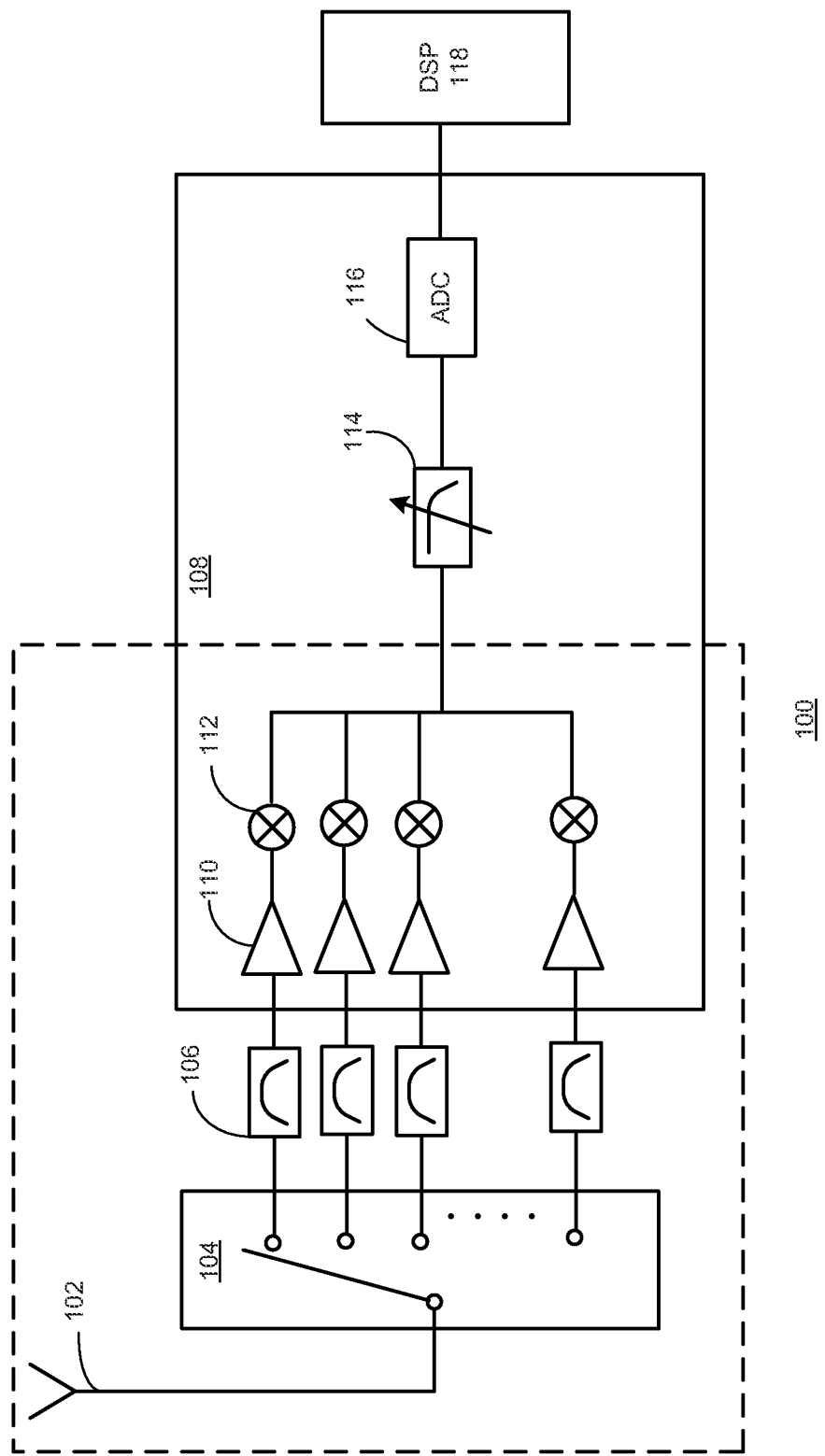
FIG. 1 presents a diagram illustrating the architecture of a conventional wireless front-end (prior art).

To meet the multi-standard and multi-band requirement, or to be able to receive RF signals of different frequency bands, a conventional receiver relies on the use of multiple demodulators, each capable of demodulating RF signals at a particular frequency band. FIG. 1 presents a diagram illustrating the architecture of a conventional wireless receiver (prior art). Receiver 100 includes an antenna 102; a single-throw multiple-position switch 104; a number of band-pass filters (BPFs), such as BPF 106; a number of amplifiers, such as an LNA 110; a number of demodulators, such as demodulator 112; a tunable low-pass filter (LPF) 114; an analog-to-digital converter (ADC) 116; and a baseband digital signal processor (DSP) 118.

During operation, depending on the active standard, and thus the frequency band of the desired RF signal, single-throw multiple-position switch 104 switches the received RF signal to a corresponding BPF, whose passing band corresponds to the frequency band of the desired RF signal. The output of the selected BPF is sent to a corresponding narrowband LNA for amplification, and a demodulator (or a mixer) subsequently down-converts the amplified RF signal to an IF signal or to a baseband signal. For example, if receiver 100 is configured to work at the GSM mode, switch 104 will switch received RF signals (which may include GSM signals at a frequency band around 800 MHz and RF signals at other frequency ranges) to BPF 106, which has a passing band corresponding to the particular GSM band. The output of BPF 106 is sent to LNA 110 for amplification, and subsequently, demodulator 112 down-converts the amplified signal. In one embodiment, the local oscillator (not shown in FIG. 1) of demodulator 112 is tuned to the same frequency as that of the RF carrier for the GSM signal, hence the GSM signal is directly converted to a baseband signal. Tunable LPF 114 then filters through the baseband signal while rejecting the summation frequency. ADC 116 converts the analog signal to the digital domain before sending it to a baseband digital signal processor (DSP) 118 for further processing. Note that if the demodulators are quadrature demodulators, then they will generate in-phase (I) and quadrature (Q) signals, each of which is filtered and AD converted separately before being sent to the DSP for separate processing. For simplicity, only one channel is shown in FIG. 1.

Note that, in FIG. 1, the LNAs (such as LNA 110), the demodulators (such as demodulator 112), tunable LPF 114, and ADC 116 are integrated onto a single integrated circuit (IC) chip 108. With a dedicated LNA for a particular frequency band, the receiver performance can be optimized for each frequency band. However, a large amount of chip area is required to accommodate the multiple LNAs. In addition, a large number of input lines (twice the number of the LNAs) will be needed, which not only increases the size of the IC chip, but also increases the size of a supporting printed circuit board (PCB), and thus significantly increases the size of the device. For example, in order for IC chip 108 to receive GSM signals (which can have at least 4 frequency bands), Wideband Code Division Multiple Access (W-CDMA) signals (which can have at least 3 frequency bands), and Long Term Evolution (LTE) signals (which can have at least 3 frequency bands), 10 LNAs are needed, which requires a receiver chip having at least 20 inputs.

Figure 2:
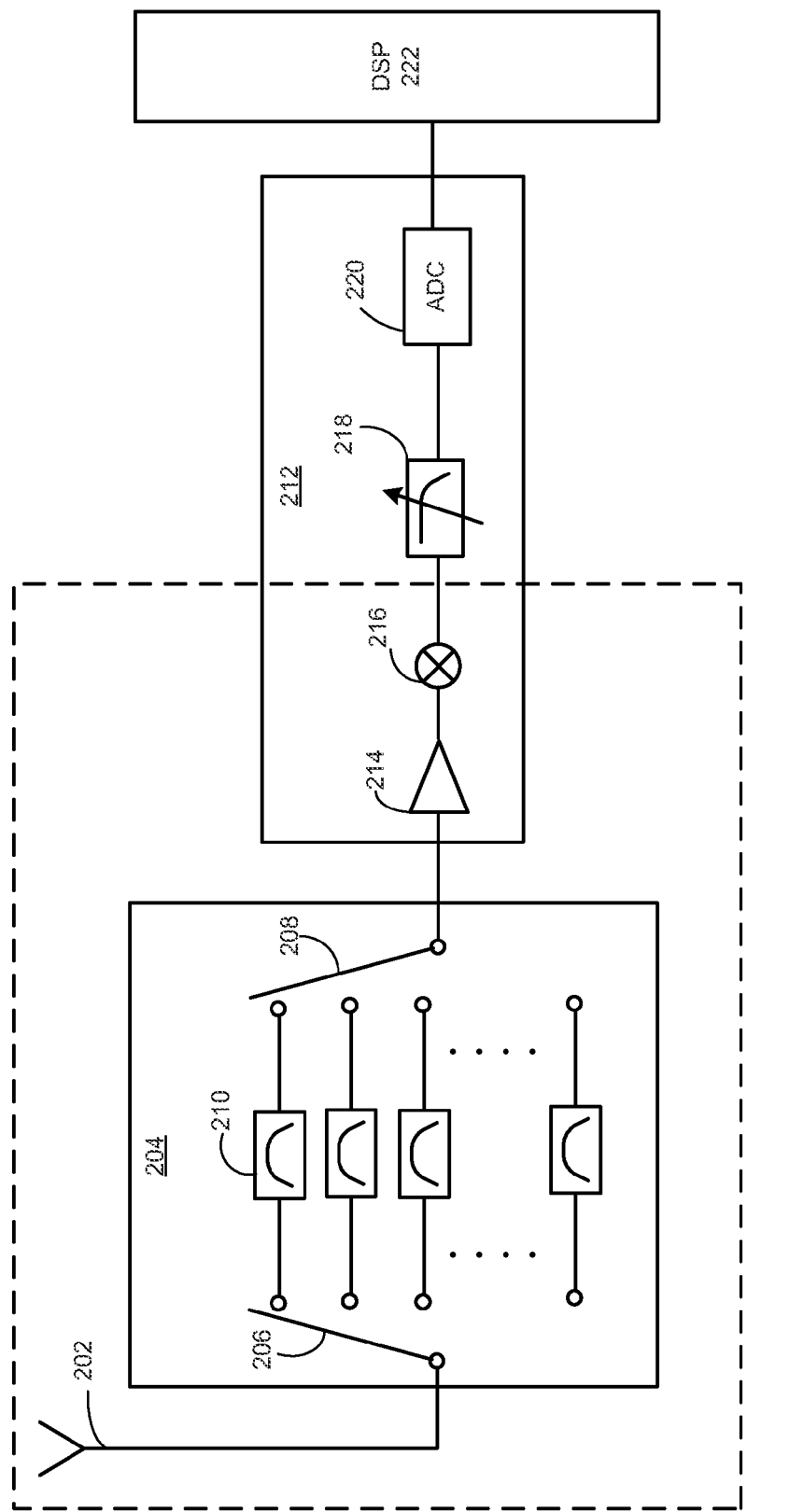
FIG. 2 presents a diagram illustrating the architecture of a wireless front-end, in accordance with an embodiment of the present invention.

To reduce the size of the receiver chip and the size of the supporting PCB, it is desirable to use a single LNA to provide application for RF signals at different frequency bands. FIG. 2 presents a diagram illustrating the architecture of a wireless front-end, in accordance with an embodiment of the present invention. In FIG. 2, receiver 200 includes an antenna 202, a switch chip 204, an ultra-wideband amplifier 214, a tunable demodulator 216, a tunable LPF 218, an ADC 220, and a baseband DSP 222.

Switch chip 204 includes a 1×n switch 206, a number of BPFs (such as BPF 210), and an n×1 switch 208. Note that switches 206 and 208 together with BPFs of different passing bands ensure that RF signals of the different frequency bands are fed to wideband amplifier 214 via a single input. Therefore, the size of receiver IC chip 212, which includes ultra-wideband amplifier 214, tunable demodulator 216, tunable LPF 218, and ADC 220, can be much smaller than that of receiver IC chip 108 shown in FIG. 1. In addition, because only one amplifier is needed, the total power consumed by receiver IC chip 212 can be reduced significantly. In one embodiment, IC chip 212 can be fabricated using a standard complementary metal-oxide-semiconductor (CMOS) technology.

During operation, depending on which standard is currently active, and thus the frequency band of the desired RF signal, single-pole multi-throw (SPMT) switch 206 switches the received RF signal to a corresponding BPF, whose passing band corresponds to the frequency band of the desired RF signal. The outputs of all BPFs are coupled to ultra-wideband amplifier 214 via SPMT switch 208. Note that the switch position of switch 208 corresponds to that of switch 206, thus ensuring that the correct filter output is sent to ultra-wideband amplifier 214 for amplification. For example, if receiver 200 is configured to work at the GSM mode, switches 206 and 208 ensure that the received RF signals are filtered by a corresponding BPF and the filtered output is sent to ultra-wideband amplifier 214. Demodulator 216 subsequently down-converts the amplified RF signal to an IF signal or to a baseband signal. In one embodiment, demodulator 216 is a quadrature demodulator. In one embodiment, the local oscillator (not shown in FIG. 2) of demodulator 216 is tuned to the same frequency as that of the RF carrier for the GSM signal, hence the GSM signal is directly converted to a baseband signal. Tunable LPF 218 rejects the signal at the summation frequency and sends the baseband signal to ADC 116, which converts the analog signal to the digital domain before sending it to a baseband DSP 222 for further processing.

To enable multi-standard/multi-band application, wideband amplifier 214 needs to have a bandwidth that is sufficiently wide in order to cover the entire wireless communication spectrum (from 300 MHz all the way to 3.6 GHz). Such a wide bandwidth imposes a number of design challenges. For example, the resistance of the amplifier needs to match that of the antenna (50 Ohm) over such a wide band, and the Noise Figure (NF) of the amplifier also needs to be sufficiently low over the entire band.

Figure 3B:
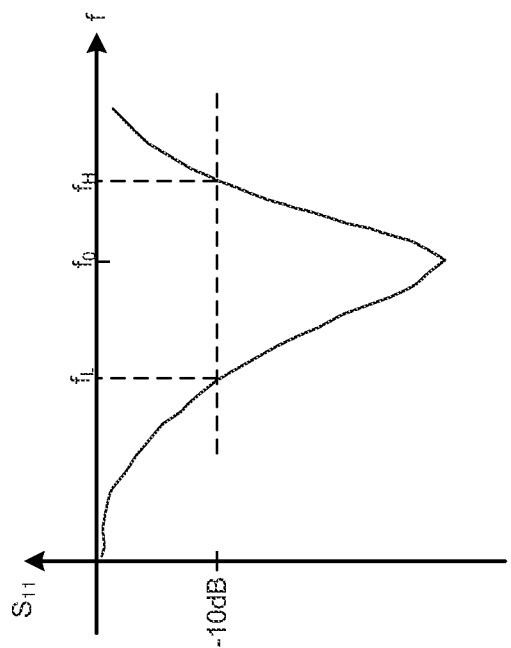
FIG. 3B presents a diagram illustrating an exemplary frequency response of the return loss for a conventional wideband amplifier (prior art).
Figure 3A:
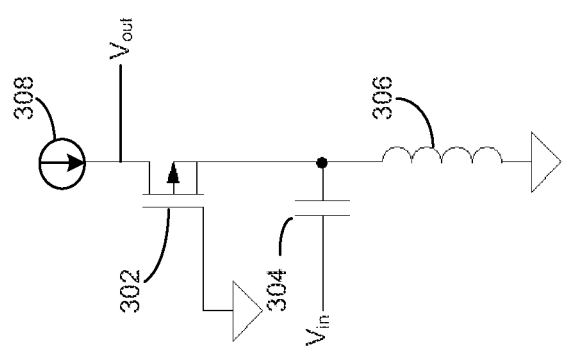
FIG. 3A presents a schematic of a conventional wideband amplifier (prior art).

Conventional narrowband amplifiers often rely on inductive degeneration to achieve impedance matching and noise reduction. However, the inductive-degeneration solution cannot be used for wideband amplifiers. To match the impedance of the antenna and to reduce noise over a wide frequency band, a conventional wideband amplifier can be designed to have its input impedance to be the reciprocal of its transconductance. FIG. 3A presents a schematic of a conventional wideband amplifier (prior art). In FIG. 3A, amplifier 300 includes a transistor 302, a capacitor 304, an inductor 306, and a current source 308. The input impedance of amplifier 300 is the reciprocal of its transconductance, $R_{in}=1/g$. Hence, wideband impedance matching can be achieved by setting $g_m=1/50\Omega=20$ ms. However, due to parasitic effect (such as the parasitic capacitance of inductor 306), the bandwidth of amplifier 300 is limited. For example, the input return loss (the $S_{11}$ parameter) curve often has a dip at the resonance frequency (or the pole location). FIG. 3B presents a diagram illustrating an exemplary frequency response of the return loss for a conventional wideband amplifier (prior art).

Figure 3D:
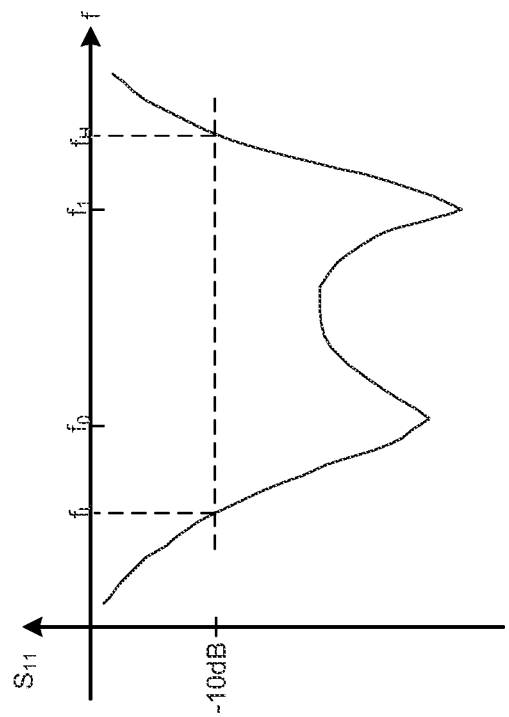
FIG. 3D presents a diagram illustrating an exemplary frequency response of the return loss for an ultra-wideband amplifier in accordance with an embodiment of the present invention.
Figure 3C:
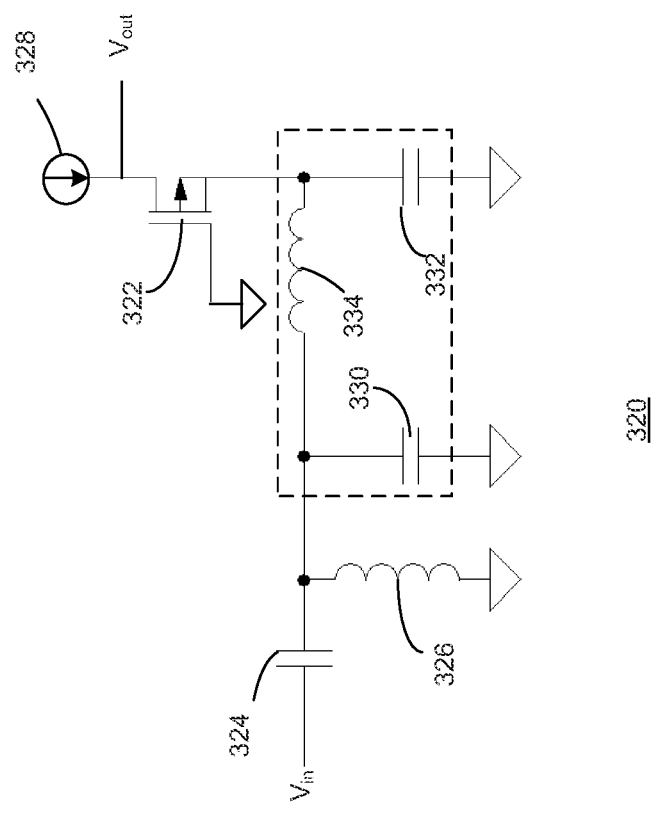
FIG. 3C presents a schematic of a wideband amplifier in accordance with an embodiment of the present invention.

To increase the bandwidth, embodiments of the present invention implement a two-pole amplifier. FIG. 3C presents a schematic of an ultra-wideband amplifier in accordance with an embodiment of the present invention. Similarly to amplifier 300 in FIG. 3A, in FIG. 3C, amplifier 320 also includes a transistor 322, a DC-blocking capacitor 324, a ground-choking inductor 326, and a current source 328. In addition, amplifier 320 includes a pair of parallel capacitors 330 and 332, and a serial inductor 334. Note that these added components (shown in the dashed block) can extend the bandwidth of amplifier 320 because now there are two resonance frequencies, each corresponding to a dip in the $S_1$ curve. FIG. 3D presents a diagram illustrating an exemplary frequency response of the return loss for an ultra-wideband amplifier in accordance with an embodiment of the present invention. As one can see from FIG. 3D, the existence of the two poles (one at $f_0$ and another one at $f_1$) significantly increases the bandwidth of amplifier 320. In one embodiment, the bandwidth (for $S_{11}<-10$ dB) of amplifier 320 can be extended by about 20% when two poles are introduced. In a further embodiment, the capacitances for capacitors 324, 330, and 332 are 3.9 pF, 500 fF, and 2.6 pF, respectively; and the inductances of inductors 326 and 334 are 7.8 nH and 5.2 nH, respectively. This results in the center frequency of amplifier 320 being 1 GHz with 10% matching. In one embodiment, transistor 322 can be a metal-oxide-semiconductor field-effect transistor (MOSFET).

It is desirable for the wideband amplifier to have a low NF. However, amplifier 320 has a fixed signal-to-noise ratio (SNR) because its SNR is proportional to its transconductance, which has a locked value of 20 ms due to the impedance matching requirement. To further reduce noise, in one embodiment, an additional amplifier stage is added. In one embodiment, a common-emitter amplifier stage is added.

Figure 4:
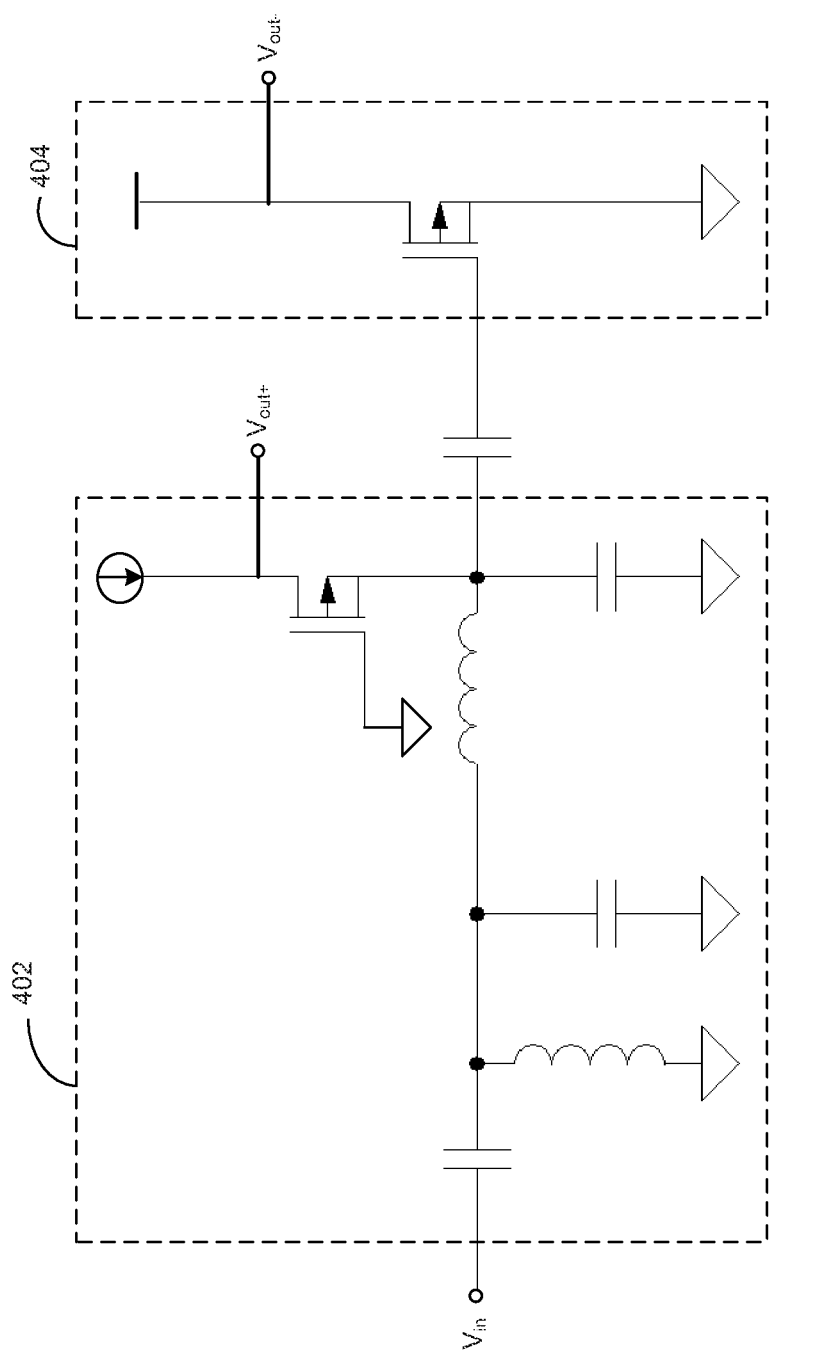
FIG. 4 presents a schematic of a noise-cancelling wideband amplifier in accordance with an embodiment of the present invention.

FIG. 4 presents a schematic of a noise-cancelling wideband amplifier in accordance with an embodiment of the present invention. In FIG. 4, noise-cancelling wideband amplifier 400 includes a first amplifier stage 402 and a second amplifier stage 404. First amplifier stage 402 is similar to wideband amplifier 320 shown in FIG. 3C, and provides impedance matching to the antenna at 50 Ohm over a wide frequency range. The outputs of first amplifier stage 402 and second amplifier stage 404 are opposite in phase. By implementing a differential design, where $V_{out}=V_{out+}-V_{out-}$, the signals remain differentiated while the noises are cancelled.

The circuits shown in FIGS. 3C and 4 are merely exemplary and should not limit the scope of this disclosure. In general, embodiments of the present invention provide a solution that enables a low-power noise-cancelling receiver front-end for wireless communication. Other circuit configurations are also possible.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A receiver for wireless communication, comprising:
   a group of band-pass filters (BPFs), wherein a particular BPF is configured to filter RF signals at a particular frequency band;
   a single wideband amplifier coupled to all the BPFs, wherein the wideband amplifier is configured to amplify the filtered RF signals, and wherein the wideband amplifier has a bandwidth that ranges at least from 300 MHz to 3.6 GHz; and
   a tunable demodulator coupled to the wideband amplifier, wherein the tunable demodulator is configured to demodulate the amplified RF signals.

2. The receiver of claim 1, further comprising a single-pole multi-throw switch situated between the BPFs and the wideband amplifier, wherein the switch is configured to switch an output of a BPF to an input of the wideband amplifier.

3. The receiver of claim 1, wherein the wideband amplifier and the tunable demodulator are located on a same integrated circuit (IC) chip.

4. The receiver of claim 1, wherein the tunable demodulator is a quadrature demodulator.

5. The receiver of claim 1, wherein an input resistance of the wideband amplifier is 50 Ohm.

6. The receiver of claim 1, wherein the wideband amplifier has two poles.

7. The receiver of claim 1, wherein the wideband amplifier includes a noise-cancelling stage.

8. The receiver of claim 7, wherein the noise-cancelling stage includes a common-emitter amplifier.

9. A method for receiving RF signals for wireless communication, comprising:
   receiving RF signals;
   selecting, from a group of band-pass filters (BPFs), a BPF to filter the received RF signals at a particular frequency band;
   amplifying the filtered RF signals using a single wideband amplifier regardless of a carrier frequency of the filtered RF signals, and wherein the single wideband amplifier has a bandwidth that ranges at least from 300 MHz to 3.6 GHz; and
   demodulating the amplified RF signals.

10. The method of claim 9, wherein demodulating the baseband signal involves quadrature demodulating.

11. The method of claim 9, wherein an input resistance of the wideband amplifier is 50 Ohm.

12. The method of claim 9, wherein the wideband amplifier has two poles.

13. The method of claim 9, wherein the wideband amplifier includes a noise-cancelling stage.

14. The method of claim 13, wherein the noise-cancelling stage includes a common-emitter amplifier.

* * * * *